Patented July 11, 1939

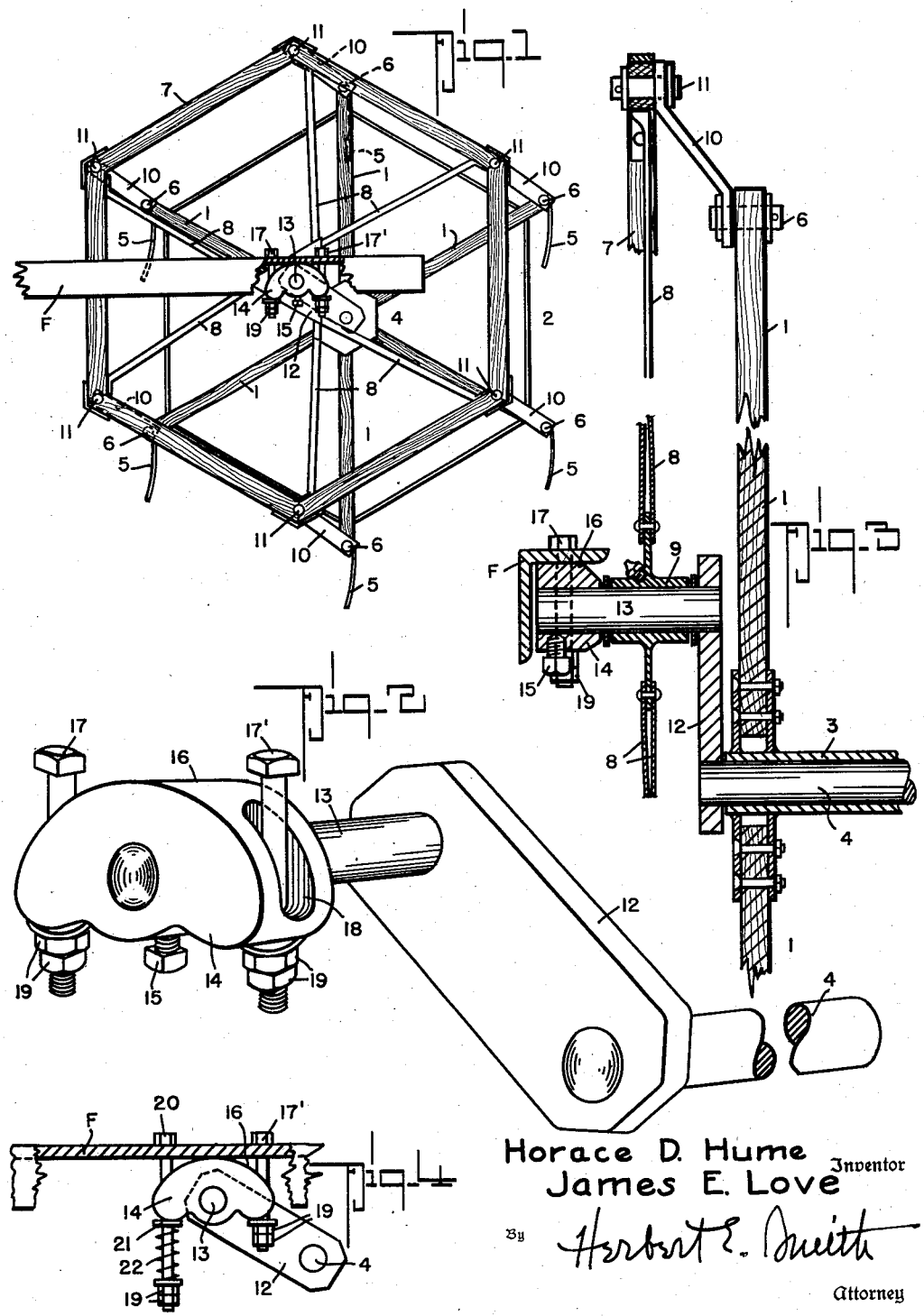

2,165,382

UNITED STATES PATENT OFFICE 2,165,382

ADJUSTABLE MOUNT

Horace D. Hume and James E. Love, Garfield, Wash.

Application April 15, 1938, Serial No. 202,293

6 Claims. (Cl. 56—226)

Our present invention relates to an adjustable mount for rotary reels of the supplemental movement type employed on harvesting machines, together with suitable cutters, usually of the sickle type, by which the crop may be lifted from the ground just ahead of the cutters and held lifted from the ground during the cutting moment, and then the cut crop further lifted by the reel and passed to a thresher portion of the harvesting machine, or moved to one side of the ends of the cutter and draper and deposited in windrows.

By means of the adjustable mount for the reel, the tines of the reel may be adjusted for a feathering action or supplemental rotary movement that insures a thorough pick-up and carriage of the crop of vines, fallen or down grain, and other ground crops, thus leaving the harvested field cut clean of the gathered crop.

In carrying out our invention the rotary reel with its supplemental moving tines is mounted in a frame of the harvester parallel with and above a reciprocating cutter or sickle and in proper relation thereto so that the tines will lift the crop ahead of the cutter and then lift and pass the cut crop rearwardly of the cutter to the draper or transversely moving carrier.

Due to irregularities in the field, and the presence of stones, abupt rises or other obstructions in the soil, this feathering action or supplemental movement of the tines is necessary in order to prevent undue strains and possible breakage of parts of the reel, and inasmuch as conditions vary in different ground crops, an adjustment in the supplemental movement of the tines is required to meet varying conditions in the crop.

For this adjustment of the tines we provide a structure that embodies a supporting axle, a rotary reel mounted thereon and a series of tines mounted on the reel capable of being adjusted to secure a greater or lesser feathering action or supplemental movement as the tines revolve with the reel. An eccentric mount is provided at the outer end of the axle and supported on a suitable frame portion of the harvester, and this mount is provided with an offset rigid stub-axle on which is journaled an auxiliary rotary head which revolves with the reel. Transmission means are provided between the auxiliary head and the tines for imparting the supplemental movement to the tines, and means are provided for adjusting the eccentric mount to increase or decrease the supplemental movement of the tines and at the same time to adjust the tines with relation to the ground surface in which the crops are growing. The reel is revolved about its axis by means of power from a suitable source, applied to its inner end (not shown).

Our invention consists in certain novel combinations and arrangements of parts as will hereinafter be more fully set forth and claimed. In the accompanying drawing we have illustrated one complete example, and a slight modification thereof, in which the parts are combined and arranged according to the best mode we have so far devised for the practical application of the principles of our invention.

Figure 1 is a view in elevation at the outer end of a reel in which our invention is embodied, parts being broken away for convenience in disclosing the mount.

Figure 2 is an enlarged perspective view showing the main axle and the mount at the outer end thereof, the reel being omitted.

Figure 3 is a sectional detail view showing a portion of the tubular reel shaft, the main axle, and the stub-axle forming part of the mount, and also showing the mount supported on a frame member.

Figure 4 is an end elevation of the mount in which a resilient structure is embodied.

The angle-iron member F shown in Figures 1, 3, and 4 is a part of the harvester frame, and two of these frame members are utilized for supporting the reel in its proper relation to the sickle or other cutter of the harvester. The frame members, one at each end of the reel, project forwardly of the draper frame in the direction of travel of the implement, and the rotary reel is mounted in these members, transversely of the harvester.

The reel has two polygonal or hexagonal heads, the outer one of which is shown as comprising spokes 1 and an end frame 2, and this outer head, as is also the spaced inner head (not shown), is rigidly mounted on a tubular reel shaft 3 that is journaled on a supporting axle 4. The main axle and reel simetimes reach a length of twenty-four feet, and stable mounts in the frame members F are required for properly supporting the axle and its rotary reel to insure maximum efficiency of the reel in the performance of its work of gathering the ground crop and passing it across the cutter to the draper.

The resilient tines 5 are arranged in longitudinally extending rows on the reel between its heads, and they revolve with the reel, but in addition are given a supplemental movement or feathering action to gather the crop as the lower tines swing rearwardly over the ground surface.

The tines, in rows, are mounted on oscillatable tine-bars 6 which extend longitudinally of the reel, and are journaled in the spaced heads of the reel in suitable manner. The feathering action or supplemental movement of the tines is imparted thereto through the tine-bars, and the tine bars are oscillated through the operation of an eccentric auxiliary head 7 having spokes 8 and a hub 9 and located exterior of the outer reel-head. Crank arms 10, mounted at one end on the tine-bars, each have another end pivotally connected at 11 to the auxiliary eccentric head, and this crank connection provides the feathering action of the tines.

As best seen in Figure 3 the hub or center of the auxiliary head is off-set, eccentrically from the reel-shaft and its axle, and the rotation of the eccentric head in its eccentric relation to the longitudinal axis of the reel causes the oscillation of the tine bars.

The supporting axle 4, at its outer end is supported on the frame member F through the use of a special adjustable mount, this mount for the outer end of the axle being shown in Figures 2 and 3, and this mount is adjustable with relation to the frame member F for the purpose of changing the feathering action, and for varying the scraping or raking relation of the tines to the surface of the soil of the field and to the cutter knives.

One end of the axle 4 is fashioned with a rigid radial arm 12, and this arm is formed with a rigid stub-axle 13, parallel with the reel-shaft but offset therefrom, to provide a journal bearing for the hub 9 of the auxiliary, eccentric, operating head, as indicated. The sub-axle is supported by means to be described so that it may be rocked or oscillated on its longitudinal axis as a center in order to move the axle 4 through an arc and as a center for adjusting the tines.

For mounting the stub-axle in frame F we employ a head-block 14 having a hole to receive the end of the stub-axle, and a set bolt 15 holds the block rigidly on the stub axle in its adjusted position. The top of the head-block is fashioned with a rounded surface 16 that fits up against the underside of the horizontal flange of the angle iron F, and the outer end of the stub-axle and the outer face of the block may fit against the inner face of the vertical flange of the angle bar.

A pair of bolts 17 and 17', one at each side of the stub-axle, are passed down through holes in the horizontal flange of the angle iron, and these bolts also pass through slots 18 and holes in the head-block; lock nuts 19 being employed on the lower projecting ends of the bolts to secure the head-block of the mount in the frame. By loosening one of the bolts and then tightening the other bolt, the head block may be rocked on its bearing face 16 to adjust the stub-axle in an arc about the center of the reel shaft. Then, by tightening the first bolt the head-block is rigidly mounted in its adjusted position to assure the desired action of the tines.

The reel which carries the tines comprises a pair of heads having spokes 1 radially extending from a tubular shaft 3. The outer end of this tubular shaft is supported on a relatively short shaft as 4 and its inner end may be supported in a bearing secured to a frame member F similar to the one shown in the drawing. A gear, sprocket, or similar driven device is keyed to the shaft 3 and rotated by means of power from a suitable source.

In some instances it is desirable to provide for resiliency in the axle mount, and for this purpose a long bolt, as 20 in Figure 4 is used in lieu of the bolt 17. This long bolt, after passing through the frame and head-block, is provided with a washer 21 against which the lower face of one end of the head-block bears, and a spring 22, which is coiled about the bolt is interposed between the washer and the lock nuts 19 on the lower end of the bolt. The resiliency provided by the spring device permits the mount to "give" in the event that a tine or row of tines encounters an obstruction, thus eliminating the danger of breaking, twisting, or otherwise damaging the tines.

By the utilization of the adjustable mount of our invention, the harvester may readily be adapted for work in a harvest field presenting specific conditions that must be met to insure maximum efficiency in the harvesting operations and a clean sweep of the field. By proper adjustment of the mount the implement may with facility be prepared for work in a grain field where the rotary reel is effective in gathering low, fallen, lodged, or tangled crops; and the reel and its tines may with equal facility be adjusted for work in seed crops such as peas, beans, alfalfa, clover and other similar crops.

Having thus fully described our invention, what we claim as new and desire to secure by Letters Patent is:

1. The combination with a supporting axle, a rotary reel mounted thereon, and a series of tines mounted on the reel and capable of supplemental movement, of an eccentric mount for said axle movement comprising a radially offset stub-axle, an auxiliary rotary head mounted on the stub-axle, and transmission mechanism between said auxiliary head and said series of tines.

2. The combination with a supporting axle, a rotary reel mounted thereon, a series of tines mounted on the reel and cable of supplemental movement, and a frame, of a stub-axle radially offset from the first axle and rigid therewith, an auxiliary rotary head mounted on the stub-axle and means actuated by said head for causing supplemental movement of the tines, a head block mounted on the stub-axle, and adjustable means for mounting said block in the frame.

3. The combination with a supporting axle, a rotary reel mounted thereon, tines mounted on the reel and capable of supplemental movement, and a frame, of an adjustable mount for the axle comprising a radially-offset stub-axle, a head-block adjustable on the stub-axle and means for holding said block in adjusted position, means for retaining the head-block in adjusted position with relation to the frame, an auxiliary rotary head mounted on the stub-axle, and power transmission mechanism between said auxiliary head and the tines.

4. The combination with a supporting axle, a rotary reel journaled thereon, tines mounted on the reel for supplemental movement, and a frame, of an adjustable mount for the axle comprising a radial arm rigid with said axle and a stub-axle rigid with the arm, a head-block mounted on the stub axle, a pair of bolts for securing the head-block in adjusted position to said frame, an auxiliary rotary head journaled on the stub-axle, and power transmission mechanism between said auxiliary head and the tines.

5. In a resilient mount for a rotary reel, the combination with an axle, a rotary reel mounted thereon, tines mounted on the reel for supplemental movement, and a frame, of a radially offset stub-axle rigid with the first axle, a head-block mounted on the stub-axle, a bolt for securing the head block to said frame, a second bolt connecting the head-block and frame, a spring mounted on the second bolt and interposed between the head-block and a stationary part of the bolt, an auxiliary rotary head journaled on the stub-axle, and power transmission mechanism between said rotary head and the tines.

6. In a resilient mount for a rotary reel, the combination with an axle, a rotary reel mounted thereon, tines mounted on the reel for supplemental movement, and a frame, of a radially offset stub-axle, a head block mounted on the stub-axle, adjustable means for mounting the head-block in said frame, a spring device embodied in said adjustable means to provide resiliency for the mount, an auxiliary rotary head journaled on the stub-axle, and power transmission means between the rotary head and said tines.

HORACE D. HUME.
JAMES E. LOVE.